US009180812B2

(12) United States Patent
Colvin, Sr.

(10) Patent No.: US 9,180,812 B2
(45) Date of Patent: Nov. 10, 2015

(54) STEERING WHEEL COVER WITH DRIVER ALERT SYSTEM

(71) Applicant: Bobby Ray Colvin, Sr., Columbus, MS (US)

(72) Inventor: Bobby Ray Colvin, Sr., Columbus, MS (US)

( * ) Notice: Subject to any disclaimer, the term of this patent is extended or adjusted under 35 U.S.C. 154(b) by 97 days.

(21) Appl. No.: 14/172,387

(22) Filed: Feb. 4, 2014

(65) Prior Publication Data

US 2015/0217687 A1 Aug. 6, 2015

(51) Int. Cl.

| | |
|---|---|
| ***G08B 23/00*** | (2006.01) |
| ***B60Q 5/00*** | (2006.01) |
| ***G08B 21/06*** | (2006.01) |
| ***B62D 1/06*** | (2006.01) |
| ***B60R 16/03*** | (2006.01) |
| ***B60Q 9/00*** | (2006.01) |
| ***B60W 40/08*** | (2012.01) |
| ***B60K 28/06*** | (2006.01) |

(52) U.S. Cl.

CPC .............. *B60Q 5/005* (2013.01); *B60K 28/066* (2013.01); *B60Q 9/00* (2013.01); *B60R 16/03* (2013.01); *B60W 40/08* (2013.01); *B62D 1/06* (2013.01); *G08B 21/06* (2013.01)

(58) Field of Classification Search

CPC ......... B60Q 9/00; B60W 40/08; G08B 21/06; B60K 28/066

See application file for complete search history.

(56) References Cited

U.S. PATENT DOCUMENTS

| | | | | |
|---|---|---|---|---|
| 4,210,905 | A * | 7/1980 | Coons | 340/575 |
| 5,874,892 | A * | 2/1999 | Antonellis et al. | 340/438 |
| 6,590,499 | B1 * | 7/2003 | D'Agosto | 340/575 |
| 7,710,279 | B1 * | 5/2010 | Fields | 340/575 |
| 8,564,424 | B2 * | 10/2013 | Evarts et al. | 340/439 |
| 2014/0300458 | A1 * | 10/2014 | Bennett | 340/439 |

* cited by examiner

*Primary Examiner* — Faye M Fleming

(57) ABSTRACT

A steering wheel cover with driver alert system is an apparatus that attaches to a vehicle's steering wheel. The apparatus utilizes a driver alert system to detect when a driver is falling asleep while operating a vehicle and signal an alarm. The driver alert system accomplishes this by monitoring a driver's grip on the steering wheel. When a driver's grip loosens, the driver alert system signals an alarm to wake the driver. The steering wheel cover with integrated driver alert system is fitted to an existing vehicle's steering wheel with minimal if any modifications and utilizes an external power source to charge the apparatus when the vehicle is not in use.

17 Claims, 9 Drawing Sheets

1
2
3
16
16
8
6
9

STEERING WHEEL COVER WITH DRIVER ALERT SYSTEM

FIELD OF THE INVENTION

The present invention relates generally to vehicle safety accessory. More specifically, the present invention relates to a steering wheel cover that incorporates a driver alert system that alerts a driver that has fallen asleep.

BACKGROUND OF THE INVENTION

Presently, there are many drivers on the road who drive long shifts or drive during late night hours. These conditions are prone to causing fatigue in a driver. Fatigue causes a driver to feel tired and exhausted while they are operating a vehicle. Prolonged instances of fatigue can lead to a driver losing attention, becoming distracted, or falling asleep while operating their vehicle. It is well known that drivers who have fallen asleep while operating their vehicle pose a serious threat to themselves as well as other motorists. Annually, there are thousands of deadly vehicle collisions caused by tired and inattentive drivers. Although driving related fatigue can be avoided by taking breaks between long driving intervals and driving during day time hours, some drivers are bound by deadlines or other restrictions to drive in fatigue prone conditions.

It is therefore an object of the present invention to provide an apparatus that attaches to a vehicle's steering wheel. The apparatus utilizes a driver alert system to detect and signal an alarm when a driver is falling asleep while operating a vehicle. The driver alert system accomplishes this by monitoring a driver's grip on the steering wheel. When a driver's grip loosens, the driver alert system signals an alarm to wake the driver. The steering wheel cover with integrated driver alert system is fitted to a vehicle's steering wheel with minimal if any modifications and utilizes an external power source to charge the apparatus when the vehicle is not in use.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
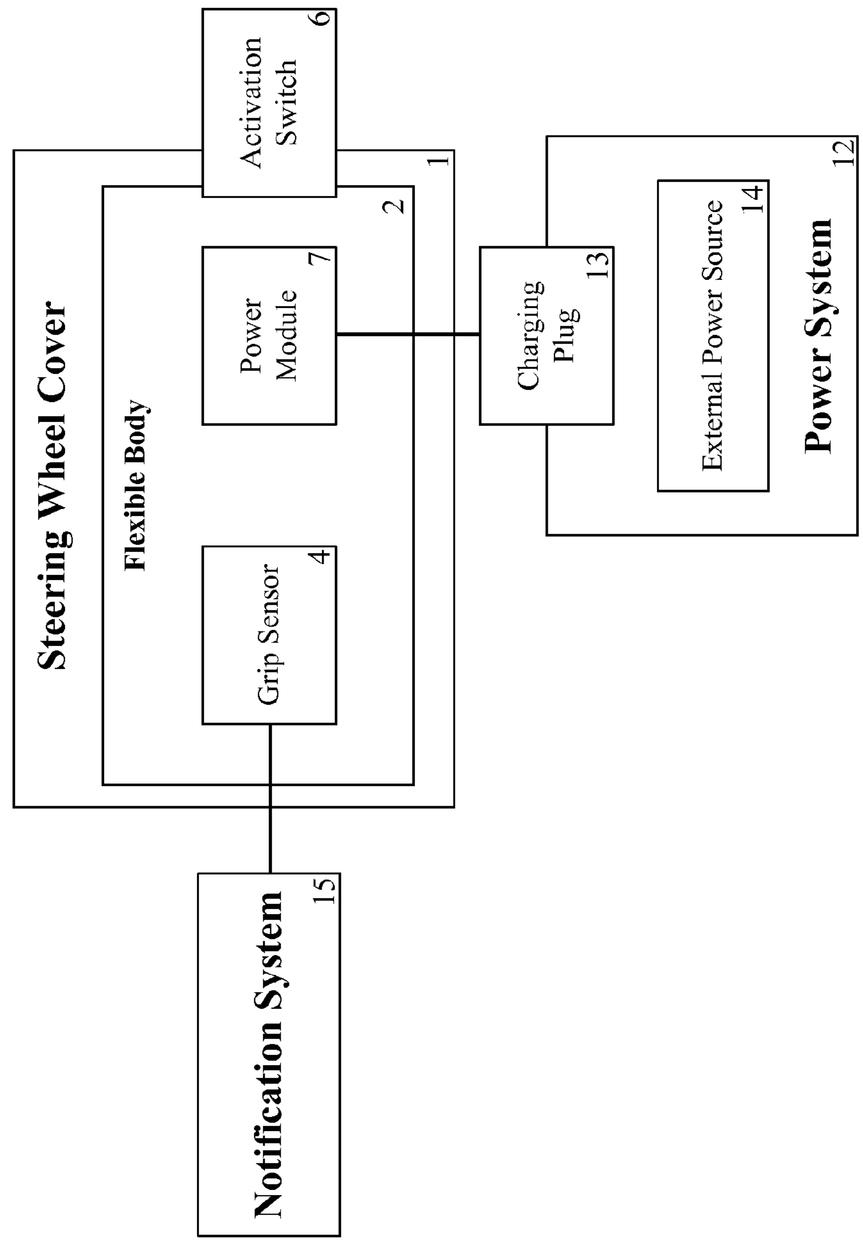
FIG. 1 is a block diagram displaying the component arrangement of the steering wheel cover, the notification system, and the power system as per the current embodiment of the present invention.
Figure 5:
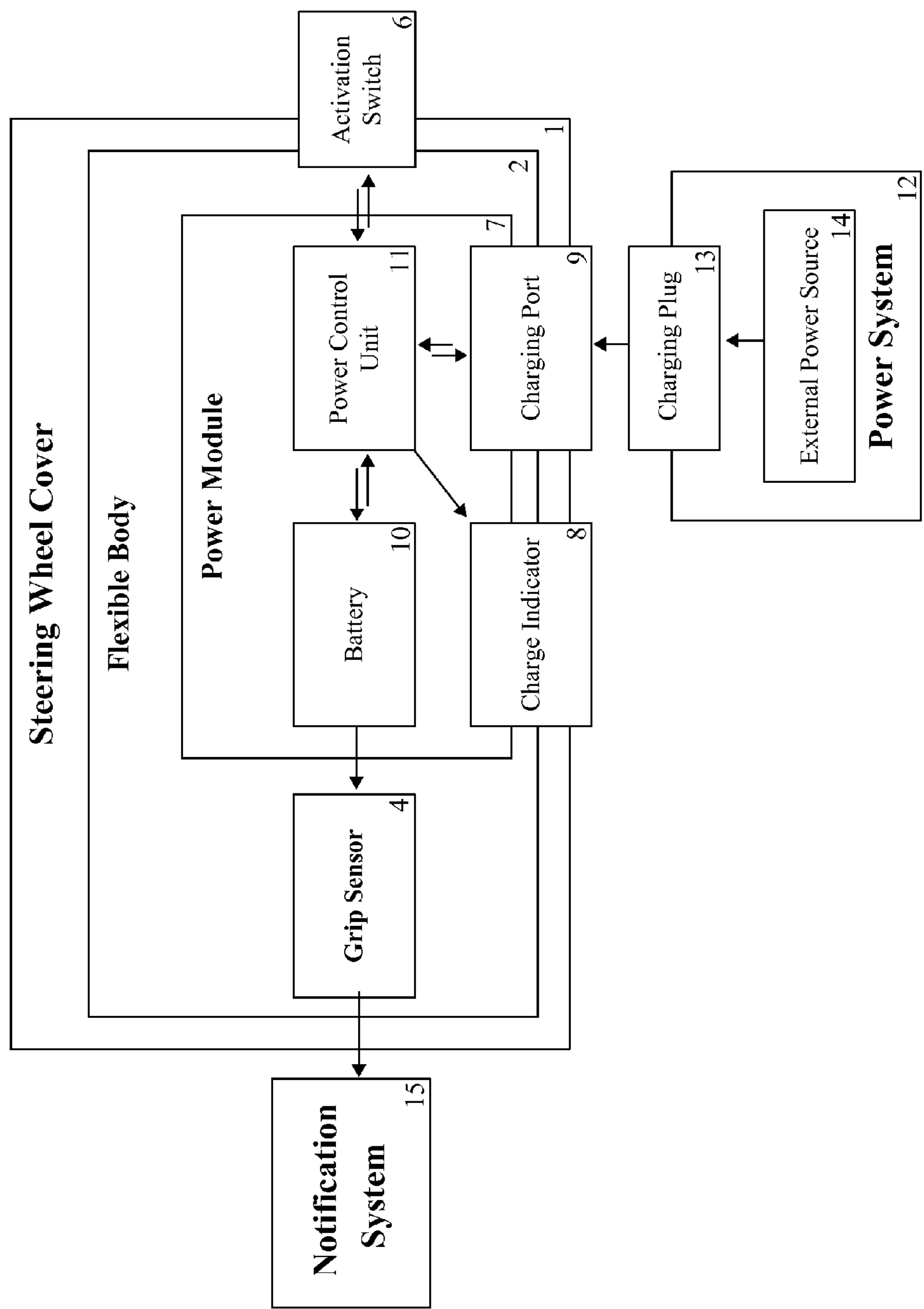
FIG. 5 is a block diagram displaying a detailed component arrangements and interactions between the steering wheel cover, the notification system, and the power system as per the current embodiment of the present invention.

Referencing FIG. 1 and FIG. 5, the present invention is a steering wheel cover 1 that contains a driver alert system for awakening a driver in case they fall asleep while operating a vehicle. The present invention accomplishes this by detecting the loosening of the divers grip with the steering wheel and activating an alert to awaken the driver. The steering wheel cover 1 with integrated driver alert system is fitted to a vehicle's steering wheels with minimal is any modifications. In the current embodiment of the present invention the steering wheel cover 1 with integrated driver alert system comprises a steering wheel cover 1, a power system 12, and a notification system 15. The steering wheel cover 1 is the component that is mounted to an existing steering wheel and is manipulated by the driver. The steering wheel cover 1 is used to detect if the drivers grip is loosened in order to signal the notification system 15. The power system 12 provides electrical power to various components of the present invention. The power system 12 is electrically coupled to an external power source 14. The notification system 15 is the component that plays an alert when it receives an activation signal from the steering wheel cover 1.

Referencing FIG. 1, the steering wheel cover 1 is a tubular shaped ring with an incised section near the interior portion of the ring. The incised section allows the steering wheel cover 1 to be mountable onto a vehicle's existing steering wheel. The steering wheel cover 1 is particularly formed to fit existing steering wheels wherein, the particular shape of the steering wheel provides the steering wheel cover 1 to remain securely installed on the existing steering wheel. The steering wheel cover 1 is communicably coupled to the notification system 15. The steering wheel cover 1 detects the loosening of a driver's grip with and sends an alert activation signal to the notification system 15 to wake the driver up. The steering wheel cover 1 is detachably coupled to the power system 12. The detachable coupling between the power system 12 and the steering wheel cover 1 is provided as a means of electrically charging or powering the internal components of the steering wheel cover 1.

Figure 2:
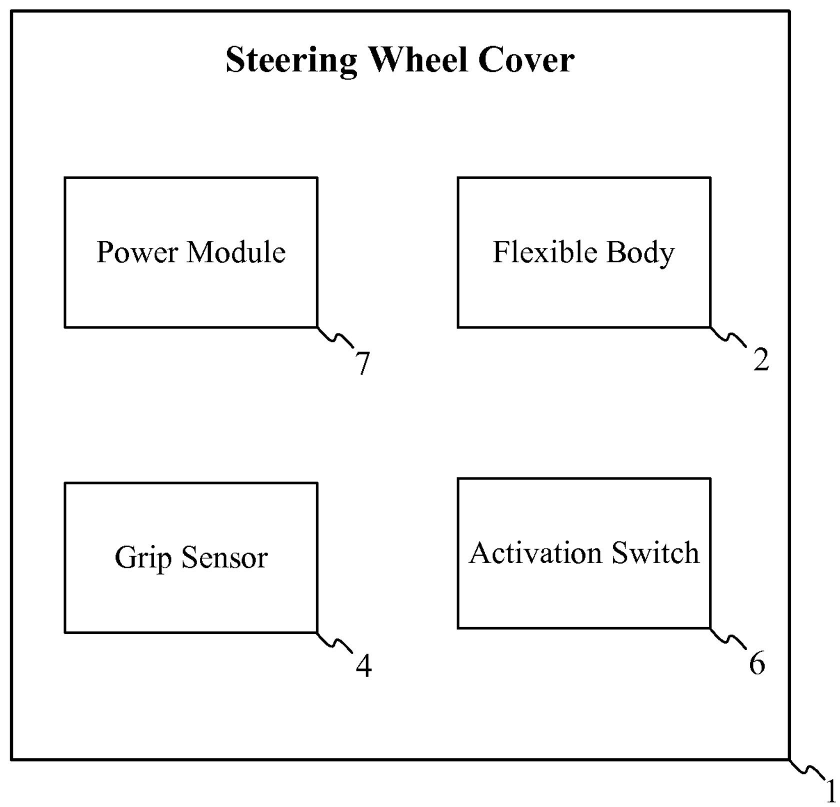
FIG. 2 is a block diagram displaying the components of the steering wheel cover as per the current embodiment of the present invention.

Referencing FIG. 1 and FIG. 2, the steering wheel cover 1 comprises a flexible body 2, an activation switch 6, a power module 7, and a grip sensor 4. The flexible body 2 provides the steering wheel cover 1 with sufficient elasticity to securely mount onto a vehicle's existing steering wheel. The grip sensor 4 functions as the component that detects if the driver is loosening their grip on with the steering wheel cover 1 as well as the component that sends an alert activation signal to the notification system 15. The power module 7 regulates the electrical power received from the power system 12 to the various electrical components within the steering wheel cover 1. The activation switch 6 is a controller that activates and deactivates the present invention.

Figure 9:
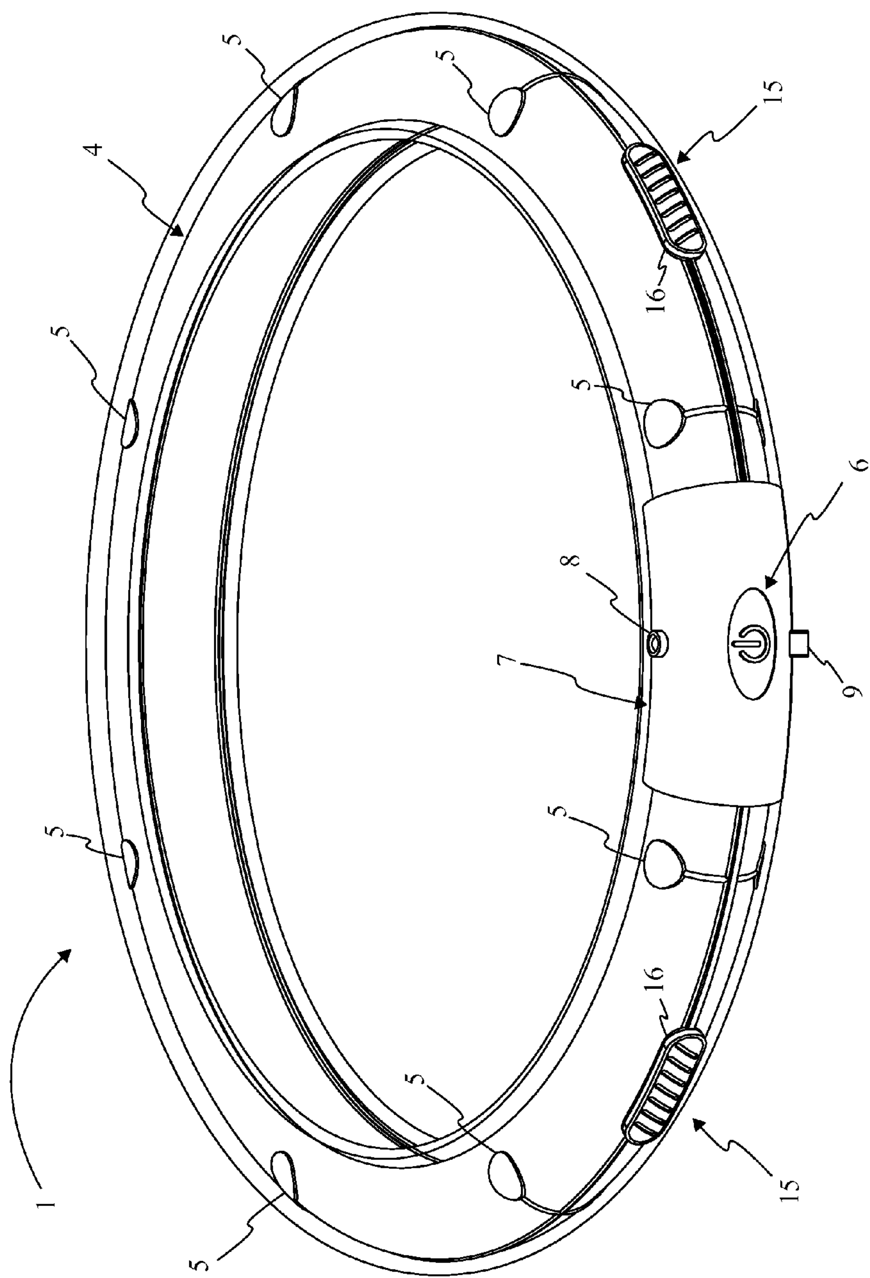
FIG. 9 is a partial transparent view displaying the component arrangement of the integrated notification device, the power module, and the grip sensor, within the flexible body as per the current embodiment of the present invention.

Referencing FIG. 5 and FIG. 9, the flexible body 2 is the portion of the steering wheel cover 1 that envelops a vehicle's existing steering wheel. The flexible body 2 is provided with sufficient elasticity to allow for a secure engagement with the existing steering wheel. The flexible body 2 is gripped by a driver's hands. The activation switch 6 is peripherally positioned on the flexible body 2. The peripheral positioning provides facilitated engagement of the activation switch 6 by the driver. The grip sensor 4 and the power module 7 are operatively disposed within the flexible body 2. The operative disposition provides the grip sensor 4 with a particular location that ensures the grip sensor 4 is engaged by a driver when the driver manipulates the flexible body 2. The operative disposition allows the power module 7 to electrically engage the grip sensor 4 as well as accomplish a positioning that minimally interferes with the driver's engagement with the flexible body 2. The flexible body 2 comprises an exterior surface 3. The exterior surface 3 is the most visible portion of the flexible body 2. The exterior surface 3 is directly engaged by the driver's grip. It should be noted that the exterior surface 3 can include a plurality of ornamental designs that are visually appealing to a driver increasing.

Referencing FIG. 6-9, the activation switch 6 is a switch input that activates and deactivates the power module 7. The activation switch 6 is peripherally positioned on the flexible body 2 wherein the activation switch 6 is positioned on the exterior surface 3. The positioning of the activation switch 6 facilitates the actuation of the activation switch 6 by the driver. The activation switch 6 is positioned on the exterior surface 3 in a location that minimally interferes with the driver gripping the flexible body 2. The activation switch 6 is operatively coupled to the power module 7. The operative coupling between the activation switch 6 and the power module 7 provides the activation switch 6 with a positioning on the flexible body 2 that is capable of interacting with the power module 7 in order to signal the power module's 7 activation and deactivation.

Figure 4:
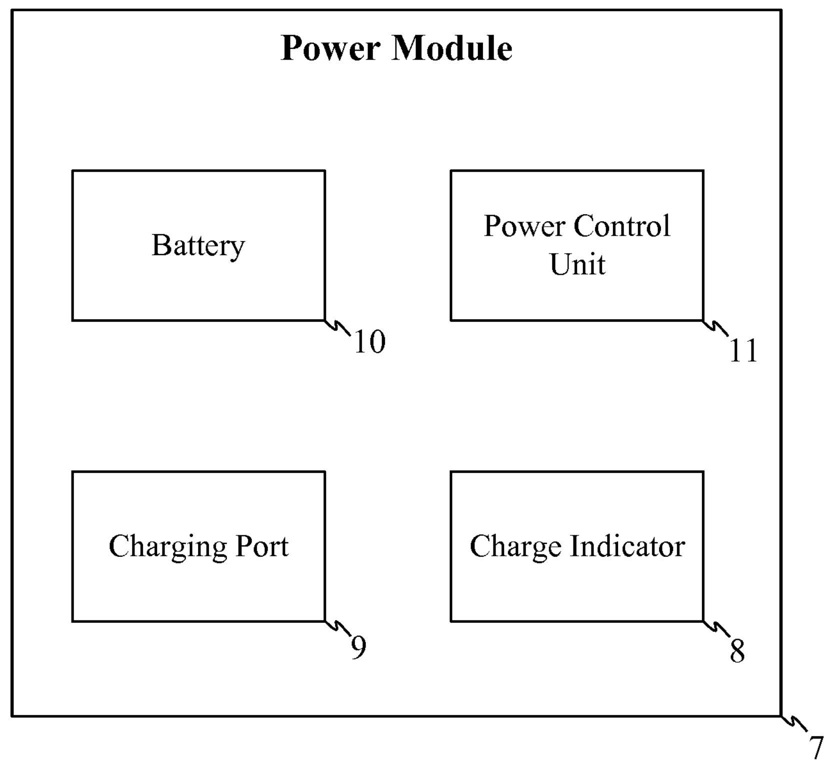
FIG. 4 is a block diagram displaying the components of the power module as per the current embodiment of the present invention.

Referencing FIG. 4, FIG. 5, and FIG. 9, the power module 7 is operatively disposed within the flexible body 2 of the steering wheel cover 1. The operative positioning allows the power module 7 to be electrically coupled to the grip sensor 4 and be operatively coupled to the activation switch 6, where the electrical coupling is provided as a means of powering the grip sensor 4, and the operative coupling is provided as means of receiving an activation and deactivation signal form the activation switch 6. The operative positioning additionally minimizes interference from the positioning of the power module 7 when mounting of the steering wheel cover 1 to a vehicle's steering wheel as well as with allowing a driver to manipulate the steering wheel cover 1. The power module 7 is rechargeable and receives electrical power through a detachable engagement with the power system 12. The power module 7 store electrical power and regulates the distribution to various electrical components.

Referencing FIG. 4, FIG. 5, and FIG. 9, the power module 7 comprises a charging port 9, a charge indicator 8, a power control unit 11, and a battery 10. The charging port 9 is an external connection that allows the power system 12 to detachably connect to the power module 7. The power control unit 11 is a controller that modulates electrical power received from the power system 12 to charge the battery 10. Additionally the power control unit 11 regulates distribution of electrical power stored within the battery 10 to other electrical components. The charge indicator 8 is a component that displays information relating to the status of the battery 10. The charge indicator 8 displays information relating to the charging of the battery 10 when the power system 12 is coupled to the charging port 9 as well as information relating to the remaining charge of the battery 10.

Figure 7:
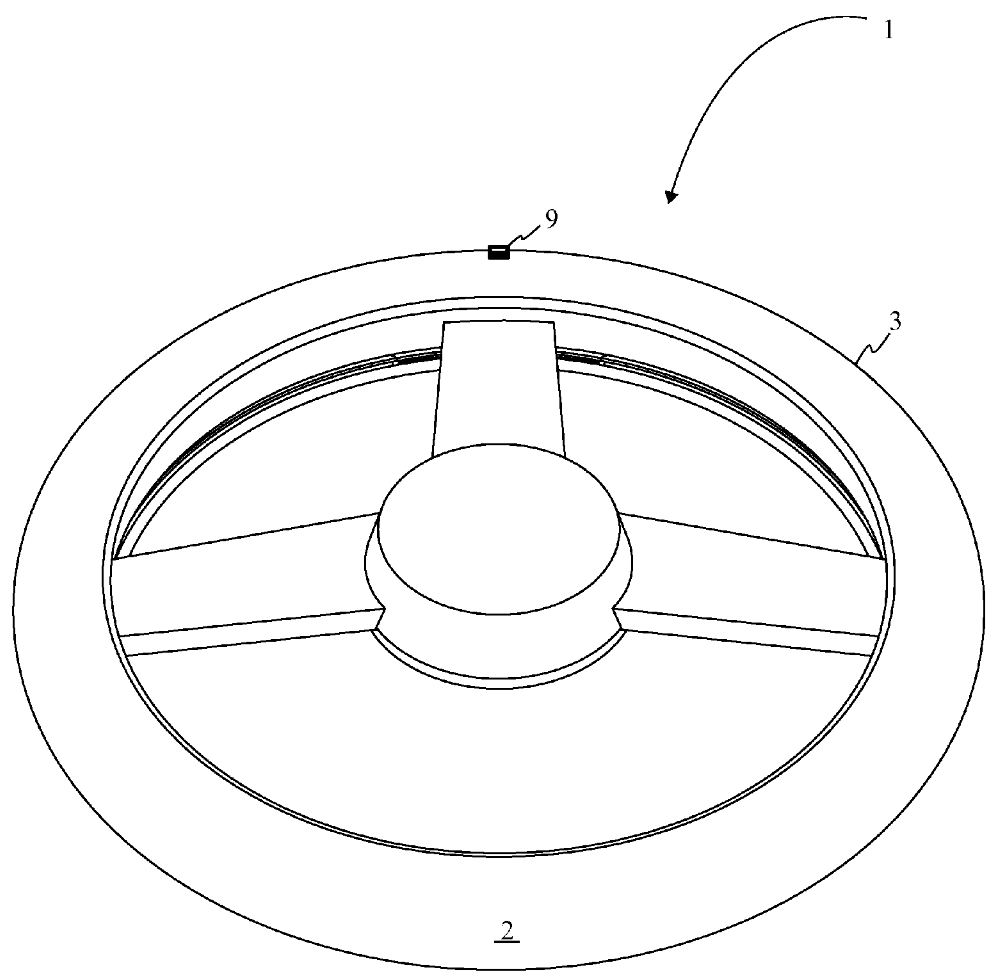
FIG. 7 is a bottom perspective view displaying the steering wheel cover mounted to an existing steering wheel.

Referencing FIG. 5 and FIG. 7, the charging port 9 is a connection port that permits a detachable engagement with the power system 12. The charging port 9 is disposed on the exterior surface 3 of the flexible body 2. The positioning of the charging port 9 facilitates access by a driver trying to charge the battery 10 but additionally provides minimal interference while the driver manipulates the steering wheel cover 1. The charging port 9 is electrically coupled to the battery 10 by way of the power control unit 11. The electrical connection with the power control unit 11 is provided to modulate the power received from the power system 12 in order to effectively charge the battery 10. The charging port 9 is detachably coupled to the power system 12. The detachable coupling allows the charging port 9 to be temporarily engaged with a charging cable while the vehicle is not in use, eliminating potential interference from a charging cable when the vehicle is being driven.

Referencing FIG. 4 and FIG. 5, the power control unit 11 is a controller that modulates electrical power between various components of the present invention. The power control unit 11 is electrically engaged to the charging port 9, the battery 10, and the charge indicator 8. The electrical engagement with the charging port 9 allows the power control unit 11 to modulate power received from the power system 12 prior to charging the battery 10. The electrical engagement with the battery 10 allows the power control unit 11 to charge and monitor the status of the battery 10. The electrical connection with charge indicator 8 allows the power control unit 11 to display the charge status of the battery 10. The operative coupling between the power module 7 and the activation switch 6 is accomplished by the power control unit 11, where the power control unit 11 receives signals from the activation switch 6 that pertain to the activation and deactivation of the system.

Figure 6:
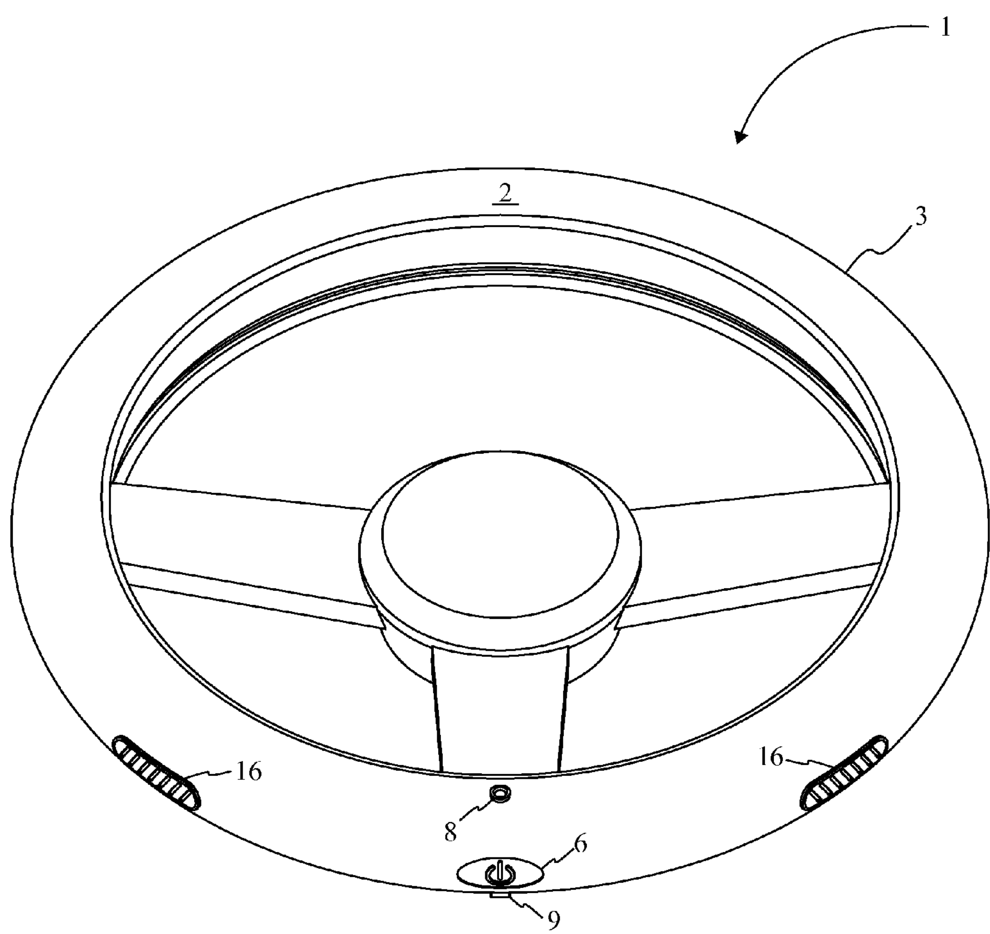
FIG. 6 is a top perspective view displaying the steering wheel cover mounted to an existing steering wheel.

Referencing FIG. 5 and FIG. 6, the charge indicator 8 display information on the charge status of the battery 10. The charge status displayed by the charge indicator 8 includes information regarding the current charging state of the battery 10 as well as if the battery 10 needs to be recharged. The charge indicator 8 is electrically coupled to the power control unit 11. The power control unit 11 is able to obtain information regarding the charge status of the battery 10 and provides said information to the charge indicator 8 to display. The charge indicator 8 is disposed on the exterior surface 3 of the flexible body 2. The positioning of the charge indicator 8 allows the driver to quickly determine the charge status of the battery 10. The positioning of the charge indicator 8 on the exterior surface 3 additionally provides minimal interference while the driver manipulates the steering wheel cover 1.

Referencing FIG. 5 and FIG. 9, the grip sensor 4 is provided as an input receiving component that detects the driver's engagement with the steering wheel cover 1. The grip sensor 4 is operatively disposed within the flexible body 2. The operative disposition provides the grip sensor 4 with a particular location that ensures the grip sensor 4 is engaged by a driver when the driver manipulates the steering wheel cover 1. The operative disposition provides the grip sensor 4 with a particular positioning that facilitates its engagement with power module 7. The grip sensor 4 is communicably coupled to the notification system 15. The communicable coupling between the grip sensor 4 and the notification system 15 is provided to allow the grip sensor 4 to send an alert activation signal to the notification system 15. The alert activation signal is a conditional signal that instructs the notification system 15 to alert the driver. The grip sensor 4 generates an alert activation signal upon detecting the loosening of a driver's grip with the steering wheel cover 1. The grip sensor can accomplish this through the use of either an array of pressure sensors 5 or a capacitive sensing material.

Figure 8:
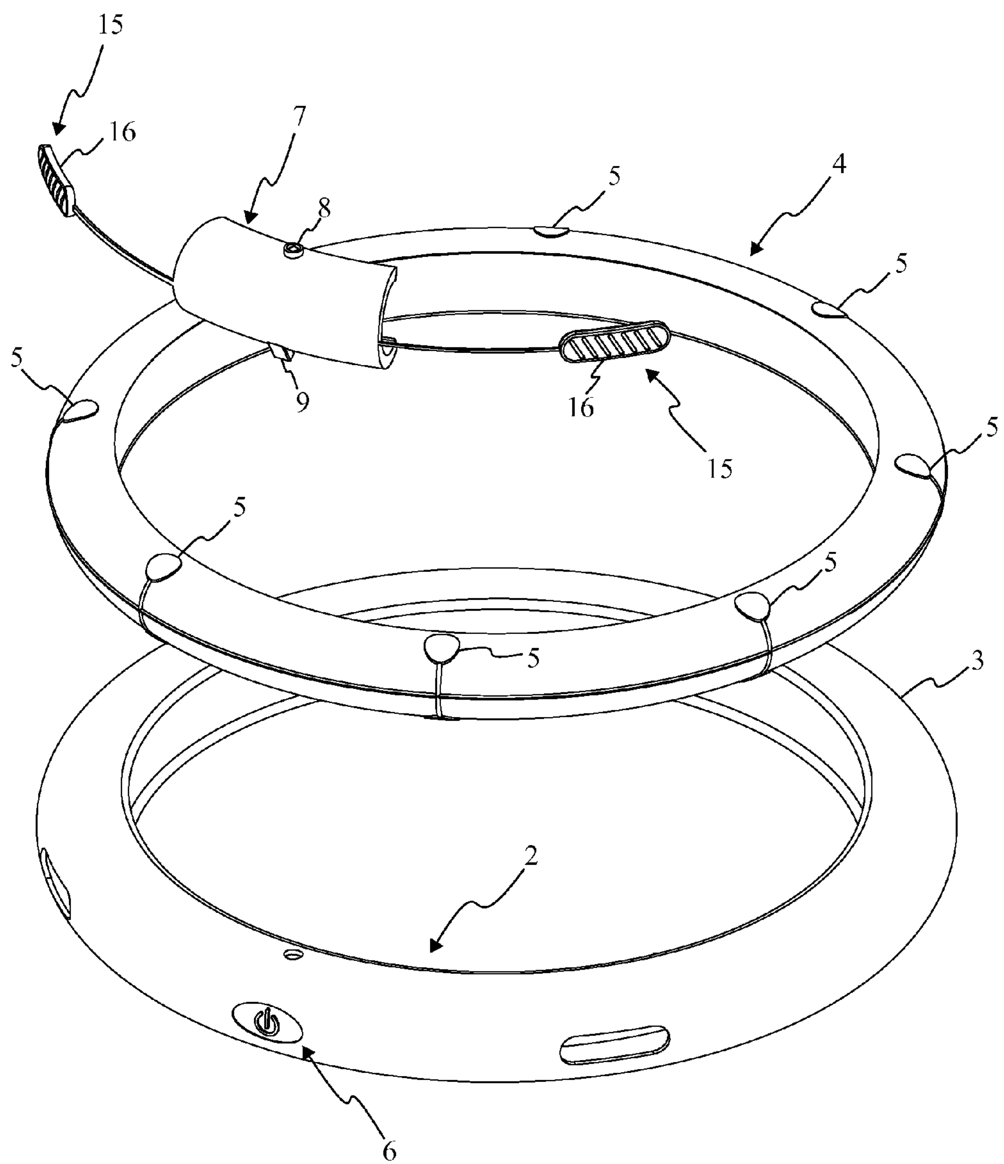
FIG. 8 is an expanded perspective view displaying the components of the steer wheel cover with an integrated notification device as per the current embodiment of the present invention.

Referencing FIG. 5, FIG. 8, and FIG. 7, the array of pressure sensors 5 are force transducer-like sensors that detect a driver's hand griping the flexible body 2 as well as the tightness of the grip. The array of pressure sensors 5 are operatively distributed within the flexible body 2. The operative distribution of the array of pressure sensors 5 ensures the driver's hand engages the flexible body 2 within close proximity of a pressure sensor 5. Each pressure sensor 5 detects pressure changes of a proximally positioned region of the flexible body 2. Each pressure sensor 5 determines the presence of the driver's grips. Once a pressure sensor 5 determines that a driver is gripping the flexible body 2, the pressure sensor 5 monitors changes in the intensity of the compression of the flexible body 2. By measuring changes in the compression of the flexible body 2 with the array of pressure sensors 5, the grip sensor 4 is able to determine if a driver's grip has been loosened with the steering wheel cover 1. The grip sensor 4 can differentiate between sudden and gradual changes in driver's grip with the flexible body 2. Gradual changes in the driver's grip would be considered indicative of the driver falling asleep or being distracted, while sudden changes in the drivers grip could indicate the driver changing gear or moving turning the steering wheel. The grip sensor 4 accomplishes this differentiation by establishing a delta minimum value that relates to how quickly a pressure measurement collected by a pressure sensor 5 changes over time. Changes in pressure that occur under the delta minimum value would be considered gradual changes, while pressure changes that occur above the delta minimum value would be disregarded as being sudden changes. The distinction between sudden changes and gradual changes allows the grip sensor 4 to generate the alert activation signal in conditions that are most likely related to the driver falling asleep or being distracted. It should be noted that the grip sensor 4 in the aforementioned embodiment would be provided with computational elements that would allow it to achieve its function.

Referencing FIG. 5, FIG. 6, and FIG. 7, the capacitive sensing material is a material that utilizes the human body's capacitance as an input. The capacitive sensing material is integrally positioned within the flexible body 2 of the steering wheel cover 1. The integral positioning of the capacitive sensing material within the flexible body 2 allows the capacitive sensing material to be positioned on the exterior surface 3. It should be noted that the capacitive sensing material can be positioned below the exterior surface 3 but would require the flexible body 2 to minimally interfere with the formation and interaction of a uniform electrostatic field. The capacitive sensing material is electrically coupled to the power module 7, wherein the capacitive sensing material requires a small amount of voltage to generate a uniform electrostatic field. The uniform electrostatic field responds to electrically conductive elements such as a driver's hand. Electrically conductive elements interfere with the uniformity of the electrostatic field in a quantifiable manner that allows the determination of the location and proximity of the interference. By measuring changes in the electrostatic field, the grip sensor 4 is able to determine if a driver's grip has been loosened with the steering wheel cover 1. To effectively utilize the capacitive sensing material with the grip sensor 4, minimum threshold values are defined to identify if the driver's hand has loosened with the steering wheel cover 1. The grip sensor 4 detect when the minimum threshold values are met in order to generate the alert activation signal. The alert activation signal is transmitted by the grip sensor 4 to the notification system 15. It should be noted that the grip sensor 4 in the aforementioned embodiment would be provided with computational elements that would allow it to achieve its function.

Figure 3:
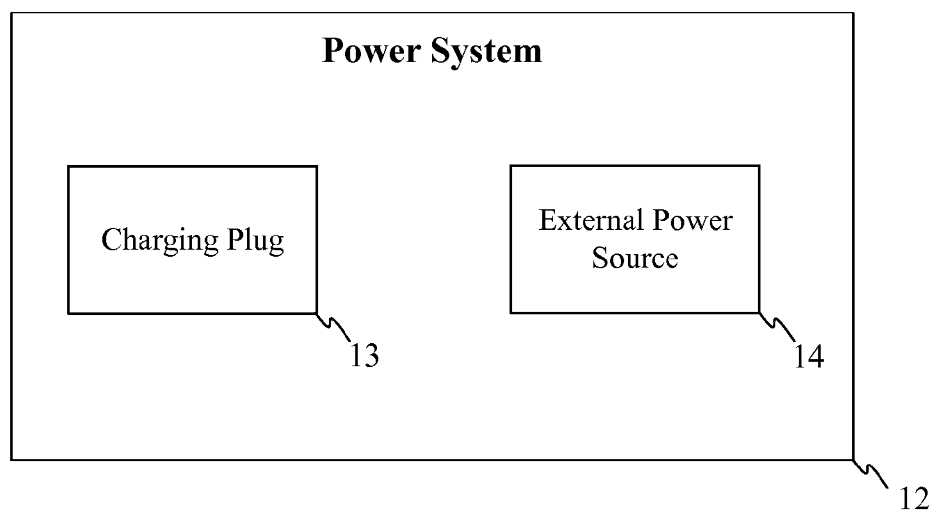
FIG. 3 is a block diagram displaying the components of the power system as per the current embodiment of the present invention.

Referencing FIG. 3 and FIG. 5, the power system 12 provides electrical power to the power module 7. The power system 12 is detachably coupled to the steering wheel cover 1 by way of the charging port 9. the power system 12 is utilized as a means of recharging the battery 10 of the power module 7 allowing the steering wheel cover 1 to function without the need of a having a charging cable attached while in use. The power system 12 is electrically coupled to an external power source 14. The power system 12 comprises a charging plug 13 and an external power source 14. The charging plug 13 is provided as a means of detachably engaging the charging port 9. The detachable engagement allows the charging plug 13 to be temporarily engaged with the charging port 9 in order to charge the battery 10 while the vehicle is not in use. The temporary engagement between the charging plug 13 and the charging port 9 eliminates potential interference from the charging plug 13 while the vehicle is being driven. The charging port 9 is electrically coupled to the external power source 14 by way of the charging plug 13. The external power source 14 is an electrical source that is utilized by the power system 12 to recharge the power module 7. The external power source 14 can be accomplished by a solar power system as well as a vehicles power supply system.

The solar power system generates electricity using solar power. The solar power system utilizes at least one solar panel to generate electrical power that is transferred to the power module by way of the charging plug. The at least one solar panel is operatively positioned by a driver within a vehicle but can additionally be positioned outside of the vehicle if desired by the user. The solar power system may comprise a plurality of solar panels to generate solar power. Each of the solar panels would be electrically coupled with the charging plug in order to charge the power module 7. The solar power system requires the sun to be present in order to generate electricity. In additional embodiments, the solar power system can be provided with a reserve battery that charges while the sun is out and is then coupled to the power module at a late time. The reserve battery would enable the solar power system to recharge the power module at night or on cloudy days.

The vehicle power supply system is a vehicle's electrical system that is engaged through the use of a vehicle charger. The vehicle power supply system utilizes the vehicle's electrical system as a means of charging the power module. The vehicle power supply system requires a vehicle to have a compatible charging port to engage the vehicles charger. The vehicle power supply system would additionally require the vehicle to charge the power module while the vehicle is not in use. In additional embodiments the vehicle power supply system can be provided with a reserve battery that that charges while the vehicle is in use. The reserve battery would enable the vehicle power system to recharge the power module while the vehicle is not in use.

Referencing FIG. 1 and FIG. 5, the notification system 15 is provided as the component that plays an alert to notify the driver that they are falling asleep. The notification system 15 is communicably coupled to the grip sensor 4. The communicable coupling between the grip sensor 4 and the notification system 15 is provided to allow the notification system 15 to receive an alert activation signal from the grip sensor 4. The alert activation signal is a conditional signal that instructs the notification system 15 to alert the driver. The alert activation signal is sent to the notification system 15 when the grip sensor 4 detects the loosening of a driver's grip with the steering wheel cover 1. The notification system 15 can be accomplished through the use of an integrated notification device 16 as well as an external notification device.

Referencing FIG. 5-6, and FIG. 8-9, the integrated notification device 16 is provided as at least one speaker that plays an alert upon receiving an alert activation signal from the grip sensor 4. The integrated notification device 16 receives the alert activation signal through a communicable coupling with the grip sensor 4. The integrated notification device 16 is electrically coupled to the power module 7. The integrated notification device 16 is integrally positioned within the flexible body 2. The integrated notification device 16 is operatively disposed on the steering wheel cover 1 where, the operative disposition of the integrated notification device 16 provides minimal interferes relative to the positioning of the grip sensor 4 and providing optimal orientation for effectively delivering the alert to a vehicle's operator.

The external notification device differs from the integrated notification device by not being integrally mounted to the steering wheel cover. The external notification device is communicable coupled to the grip sensor and plays an alert upon receiving an alert activation signal from the grip sensor.

In an embodiment of the invention, the external notification device can be accomplished using an existing vehicle's audio system. The existing vehicles audio system would be communicably coupled to the grip sensor, wherein the vehicle's audio system receives an alert activation signal from the grip sensor. The communicable coupling is accomplished through a wired connection or a wireless connection. The wireless connection utilizes either analog or digital communication frequency.

In an embodiment of the invention, the external notification device is accomplished by a portable speaker device that is communicably coupled to the grip sensor. The communicable coupling is accomplished by way of a wired connection or a wireless connection. The wireless connection is accomplished by using either analog or digital communication frequency. It should be noted that the portable speaker device can be powered by an internal battery, an electrical connection to the power system, or an electrical connection to the power module.

In an embodiment of the present invention, the activation switch would turn the present invention on or off. In the off mode, the device acts as a normal steering wheel cover, but when the switch is turned on, the device assists a driver in staying awake and alert. The present invention keeps the driver awake by sounding a loud alarm when the steering wheel is released from the grip of the driver's hands. The driver typically loosens his or her hands on the steering wheel as the driver begins falling asleep, and that is when the present invention wakes the driver up.

In an embodiment of the present invention, the power module may utilize two small flat batteries. The two small flat batteries do not add any bulkiness or discomfort to the driver's steering wheel. The charging port would charge the two small flat batteries. The power system may also utilize a solar panel to power the power module. The solar panel may be mounted by the driver wherever is convenient for the driver which may include inside or on top of the vehicle.

In an embodiment of the present invention, the steering wheel cover may be constructed using cloth, leather, vinyl, and/or any variety of fabrics or materials, that enable the application of ornamental designs. The present invention is made to fit any type of steering wheel from small steering wheels in small vehicles to large steering wheels in large trucks & buses. The present invention may also be used in SUV's (sport utility vehicle), commercial vehicles, and military vehicles.

Although the invention has been explained in relation to its preferred embodiment, it is to be understood that many other possible modifications and variations can be made without departing from the spirit and scope of the invention as hereinafter claimed.

What is claimed is:

1. A steering wheel cover with integrated driver alert system comprises:
- a steering wheel cover;
- a power system;
- a notification system;
- the steering wheel cover comprises a flexible body, a grip sensor, an activation switch, and a power module;
- the power system comprises a charging plug and an external power source;
- the flexible body comprises an exterior surface;
- the power module comprises a charge indicator, a charging port, a power control unit, and a battery;
- the power system being detachably coupled to the steering wheel cover;
- the activation switch being peripherally positioned on the flexible body;
- the activation switch being operatively coupled to the power module;
- the power module being electrically coupled to the grip sensor;
- the grip sensor and the power module being operatively disposed within the flexible body;
- the notification system being communicably coupled with the grip sensor;
- the charging port and the charge indicator being disposed on the exterior surface;
- the charging port being detachably coupled to the external power source by way of the charging plug; and
- the power control unit being electrically engaged with the charging port, the battery, and the charge indicator.

2. The steering wheel cover with driver alert system in claim 1 wherein, the notification system in an integrated notification device where, the integrated notification device is operatively disposed within the flexible body.

3. The steering wheel cover with driver alert system in claim 1 wherein, the notification system comprises an external notification device.

4. The steering wheel cover with driver alert system in claim 1 wherein, the grip sensor comprises a capacitive sensing material where, the capacitive sensing material is operatively disposed on the flexible body.

5. The steering wheel cover with the driver alert system in claim 1 wherein, the grip sensor comprises an array of pressure sensors where, the array of pressure sensors being operatively disposed within the flexible body.

6. The steering wheel cover with the driver alerts system in claim 1 wherein, the external power source is a solar power system.

7. The steering wheel cover with driver alert system in claim 1 wherein, the external power source is a vehicle power supply system.

8. A steering wheel cover with integrated driver alert system comprises:
- a steering wheel cover;
- a power system;
- a notification system;
- the steering wheel cover comprises a flexible body, a grip sensor, an activation switch, and a power module;
- the power system comprises a charging plug and an external power source;
- the flexible body comprises an exterior surface;
- the power module comprises a charge indicator, a charging port, a power control unit, and a battery;
- the notification system comprises an integrated notification device;
- the grip sensor comprise an array of pressure sensors;

the power system being detachably coupled to the steering wheel cover;

the activation switch being peripherally positioned on the flexible body;

the activation switch being operatively coupled to the power module;

the power module being electrically coupled to the grip sensor;

the grip sensor and the power module being operatively disposed within the flexible body;

the notification system being communicably coupled with the grip sensor;

the charging port and the charge indicator being disposed on the exterior surface;

the charging port being detachably coupled to the external power source by way of the charging plug;

the power control unit being electrically engaged with the charging port, the battery, and the charge indicator;

the integrated notification device being operatively disposed within the flexible body; and the array of pressure sensor being operatively disposed within the flexible body.

9. The steering wheel cover with driver alert system in claim 8 wherein, the notification system comprises an external notification device.

10. The steering wheel cover with driver alert system in claim 8 wherein, the grip sensor utilizes a capacitive sensing material where, the capacitive sensing material is operatively disposed on the flexible body.

11. The steering wheel cover with the driver alerts system in claim 8 wherein, the external power source is a solar power system.

12. The steering wheel cover with driver alert system in claim 8 wherein, the external power source is a vehicle power supply system.

13. A steering wheel cover with integrated driver alert system comprises:

a steering wheel cover;

a power system;

a notification system;

the steering wheel cover comprises a flexible body, a grip sensor, an activation switch, and a power module;

the power system comprises a charging plug and an external power source;

the flexible body comprises an exterior surface;

the power module comprises a charge indicator, a charging port, a power control unit, and a battery;

the notification system comprises an external notification device;

the grip sensor comprises a capacitive sensing material;

the power system being detachably coupled to the steering wheel cover;

the activation switch being peripherally positioned on the flexible body;

the activation switch being operatively coupled to the power module;

the power module being electrically coupled to the grip sensor;

the grip sensor and the power module being operatively disposed within the flexible body;

the notification system being communicably coupled with the grip sensor;

the charging port and the charge indicator being disposed on the exterior surface;

the charging port being detachably coupled to the external power source by way of the charging plug;

the power control unit being electrically engaged with the charging port, the battery, and the charge indicator; and the capacitive sensing material being is operatively disposed within the flexible body.

14. The steering wheel cover with driver alert system in claim 13 wherein, the notification system in an integrated notification device where, the integrated notification device is operatively disposed within the flexible body.

15. The steering wheel cover with the driver alert system in claim 13 wherein, the grip sensor comprises an array of pressure sensors where, the array of pressure sensors being operatively disposed within the flexible body.

16. The steering wheel cover with the driver alerts system in claim 13 wherein, the external power source is a solar power system.

17. The steering wheel cover with driver alert system in claim 13 wherein, the external power source is a vehicle power supply system.

* * * * *